(12) United States Patent
Koyama et al.

(10) Patent No.: US 11,136,086 B2
(45) Date of Patent: Oct. 5, 2021

(54) SADDLE RIDING VEHICLE, METHOD OF CONTROLLING SADDLE RIDING VEHICLE, AND STORAGE MEDIUM

(71) Applicant: HONDA MOTOR CO., LTD., Tokyo (JP)

(72) Inventors: Ryohei Koyama, Tokyo (JP); Kenji Suzuki, Tokyo (JP); Masanori Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/037,757

(22) Filed: Sep. 30, 2020

(65) Prior Publication Data

US 2021/0114680 A1   Apr. 22, 2021

(30) Foreign Application Priority Data

Oct. 18, 2019 (JP) .............................. JP2019-191105

(51) Int. Cl.
*B62J 50/22* (2020.01)
*G06F 3/14* (2006.01)

(52) U.S. Cl.
CPC ............ *B62J 50/22* (2020.02); *G06F 3/1423* (2013.01)

(58) Field of Classification Search
CPC ........ B60K 2370/182; B60K 2370/184; B60K 2370/186; B60K 2370/1868; B60K 2370/1876; B60K 35/00; B60K 37/02; B60K 2370/155; B60K 2370/154; G09G 2380/10; B60R 11/0235; G06F 3/142
See application file for complete search history.

(56) References Cited

U.S. PATENT DOCUMENTS

| | | | |
|---|---|---|---|
| 6,876,924 B2* | 4/2005 | Morita | G01C 21/3632 701/431 |
| 8,933,799 B2* | 1/2015 | Katoh | B60Q 3/16 340/459 |
| 9,561,725 B2* | 2/2017 | Tamura | B60K 35/00 |

FOREIGN PATENT DOCUMENTS

JP        2017-109540        6/2017

* cited by examiner

*Primary Examiner* — Koosha Sharifi-Tafreshi
(74) *Attorney, Agent, or Firm* — Amin, Turocy & Watson, LLP

(57) ABSTRACT

A saddle riding vehicle includes a first display device, a second display device, and a first transmission unit configured to transmit predetermined information from the second display device to the first display device and a second transmission unit configured to transmit shared information that is commonly displayed by the second display device from the first display device to the second display device, and the second display device prohibits the shared information transmitted from the first display device from being reflected in a display when reception of the predetermined information by the first display device has not been terminated.

12 Claims, 9 Drawing Sheets

SADDLE RIDING VEHICLE, METHOD OF CONTROLLING SADDLE RIDING VEHICLE, AND STORAGE MEDIUM

CROSS-REFERENCE TO RELATED APPLICATION

Priority is claimed on Japanese Patent Application No. 2019-191105, filed Oct. 18, 2019, the content of which is incorporated herein by reference.

BACKGROUND OF THE INVENTION

Field of the Invention

The present invention relates to a saddle riding vehicle, a method of controlling a saddle riding vehicle, and a storage medium.

Description of Related Art

There is a vehicle in which information related to the vehicle such as a vehicle speed or the like is displayed on a display part such as a liquid crystal display device or the like. In such a vehicle, a vehicle including two display parts is also provided. Then, in such a vehicle, the same information may be displayed on the two display parts (for example, see Japanese Unexamined Patent Application, First Publication No. 2017-109540 (hereinafter, referred to as Patent Document 1)).

SUMMARY OF THE INVENTION

However, in the technology disclosed in Patent Document 1, for example, when the ignition is in an ON state due to a state of the vehicle, erroneous information may be applied to one of the display parts, and the erroneous information may be reflected in the other display part.

In consideration of the above-mentioned problems, an aspect of the present invention is directed to providing a saddle riding vehicle, a method of controlling a saddle riding vehicle, and a storage medium that are capable of preventing erroneous information from being displayed on a display part.

In order to solve the above-mentioned problems and accomplish the related purposes, the present invention employs the following aspects.

(1) A saddle riding vehicle according to an aspect of the present invention includes: a first display device; a second display device; and a first transmission unit configured to transmit predetermined information from the second display device to the first display device and a second transmission unit configured to transmit shared information that is commonly displayed by the second display device from the first display device to the second display device, wherein the second display device prohibits the shared information transmitted from the first display device from being reflected in a display when reception of the predetermined information by the first display device has not been terminated.

(2) A saddle riding vehicle according to an aspect of the present invention includes: a first display device; a second display device; and a first transmission unit configured to transmit predetermined information from the second display device to the first display device and a second transmission unit configured to transmit shared information that is commonly displayed by the second display device from the first display device to the second display device, wherein the first display device prohibits transmission of the shared information to the second display device when reception of the predetermined information by the first display device has not been terminated.

(3) In the aspect of the above-mentioned (1) or (2), when information stored in the first display device is changed to the predetermined information, the first display device may determine that the predetermined information has been received.

(4) In the aspect of any one of the above-mentioned (1) to (3), after an ignition is brought into an off state, the first display device may not store information related to the vehicle.

(5) In the aspect of any one of the above-mentioned (1) to (4), after the ignition is brought into an off state, the second display device may store information related to a host display device.

(6) There is a method of controlling a saddle riding vehicle according to an aspect of the present invention including a first display device; a second display device; and a first transmission unit configured to transmit predetermined information from the second display device to the first display device and a second transmission unit configured to transmit shared information that is commonly displayed by the second display device from the first display device to the second display device, the method includes: prohibiting the second display device from reflecting the shared information transmitted from the first display device in a display when reception of the predetermined information by the first display device has not been terminated.

(7) There is a method of controlling a saddle riding vehicle according to an aspect of the present invention including a first display device; a second display device; and a first transmission unit configured to transmit predetermined information from the second display device to the first display device and a second transmission unit configured to transmit shared information that is commonly displayed by the second display device from the first display device to the second display device, the method includes: prohibiting the first display device from transmitting the shared information to the second display device when reception of the predetermined information by the first display device has not been terminated.

(8) A computer-readable non-transitory storage medium according to an aspect of the present invention stores a program causing a computer included in a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, to execute to: prohibit the second display device from reflecting the shared information transmitted from the first display device in a display when reception of the predetermined information by the first display device has not been terminated.

(9) A computer-readable non-transitory storage medium according to an aspect of the present invention stores a program causing a computer included in a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, to execute to: prohibit the first display device from transmitting the shared information to the second display device when reception of the predetermined information by the first display device has not been terminated.

According to the aspects of the above-mentioned (1), (6) and (8), since erroneous information is not reflected in the display even when erroneous information is transmitted to the second display device, erroneous information is prevented from being displayed on the display part.

According to the aspects of the above-mentioned (2), (7) and (9), since erroneous information is not transmitted to the second display device, erroneous information is prevented from being displayed on the display part.

According to the aspect of the above-mentioned (3), reception and update of correct information by the first display device become possible.

According to the aspect of the above-mentioned (4), since a management place of data is only the second display device and not the first display device, a data management amount can be reduced.

According to the aspect of the above-mentioned (5), even immediately after the ignition is in the on state, settings related to the display device are instantly applied to the second display device.

DETAILED DESCRIPTION OF THE INVENTION

Figure 1:
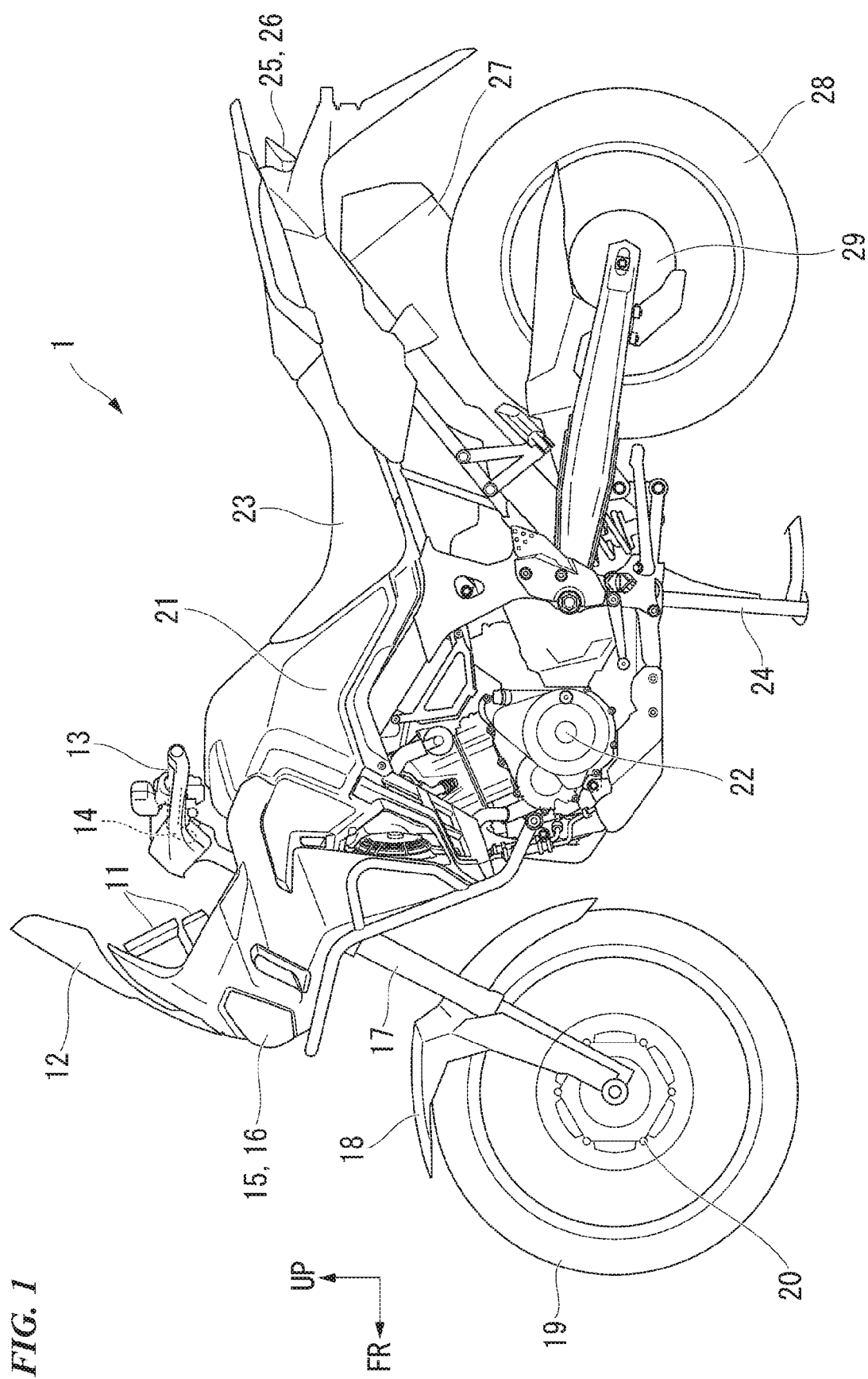
FIG. 1 is a left side view of a saddle riding vehicle according to an embodiment.

Hereinafter, an embodiment of the present invention will be described with reference to the accompanying drawings. In the drawings used in the following description, in order to increase sizes of members to recognizable sizes, scales of the members may be appropriately changed.
<Appearance of Saddle Riding Vehicle 1>

First, an appearance example and a main configuration example of a saddle riding vehicle 1 of an embodiment will be mainly described. FIG. 1 is a left side view of the saddle riding vehicle 1 according to the embodiment. The saddle riding vehicle 1 is, for example, a motorcycle. As shown in FIG. 1, the saddle riding vehicle 1 includes a display device 11, a handle 14, a lever 13, a windshield 12, a headlight 15, a front indicator 16, a fork 17, a front fender 18, a front wheel 19, a front wheel brake 20, a fuel tank 21, an engine 22, a seat 23, a stand 24, a tail lamp 25, a muffler 26, a rear wheel 28, and a rear wheel brake 29.
<Disposition Example of Display Device 11>

Figure 2:
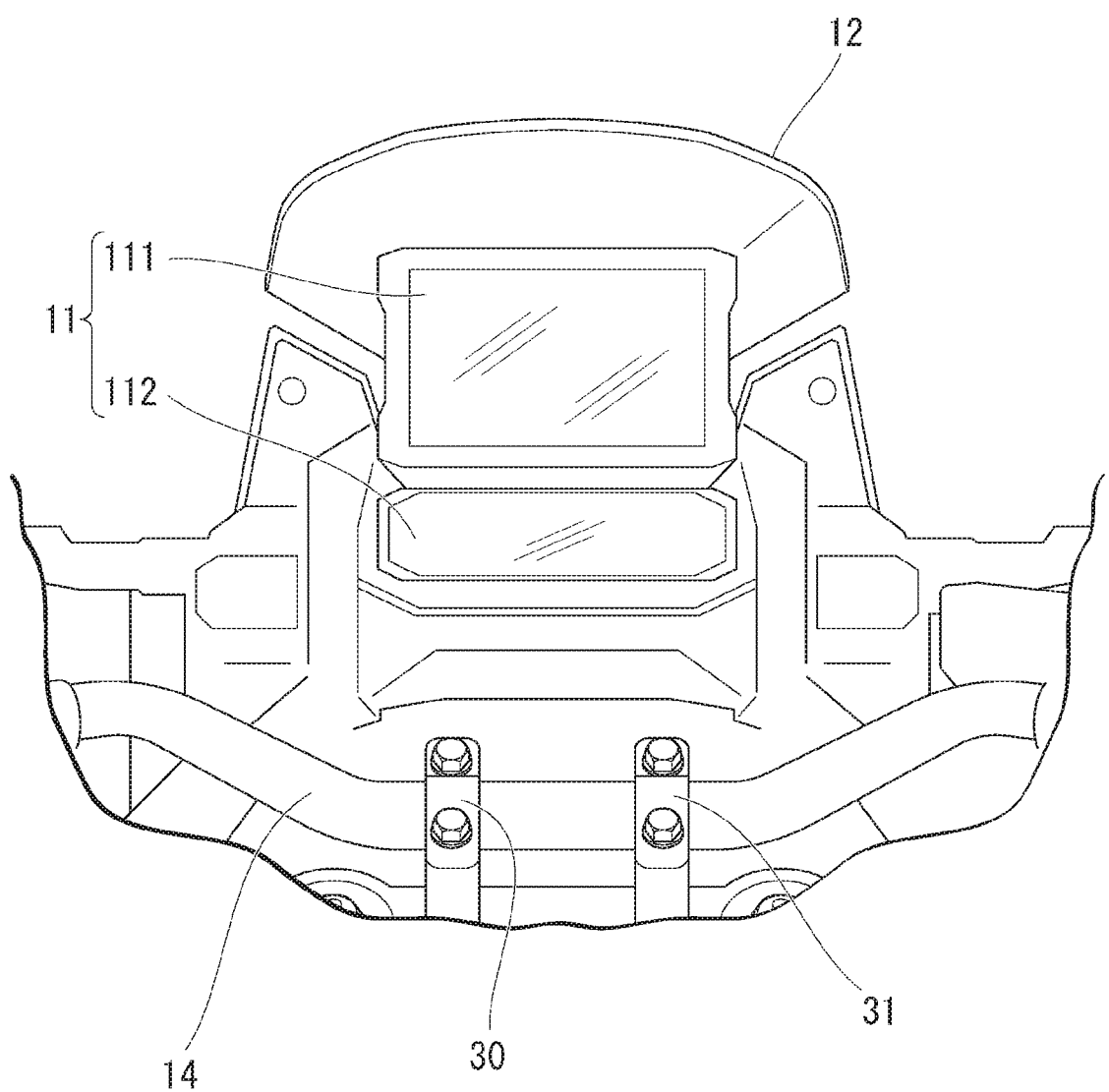
FIG. 2 is a view showing an example of disposition of a display device according to the embodiment.

Next, an example of disposition of the display device 11 included in the saddle riding vehicle 1 according to the embodiment will be described. FIG. 2 is a view showing an example of disposition of the display device 11 of the embodiment.

As shown in FIG. 2, the display device 11 includes a first display device 111 and a second display device 112. The display device 11 is installed between the windshield 12 and handle posts 30 and 31. As shown in FIG. 2, the first display device 111 is installed above the second display device 112.
<Configuration Example of Saddle Riding Vehicle>

Figure 3:
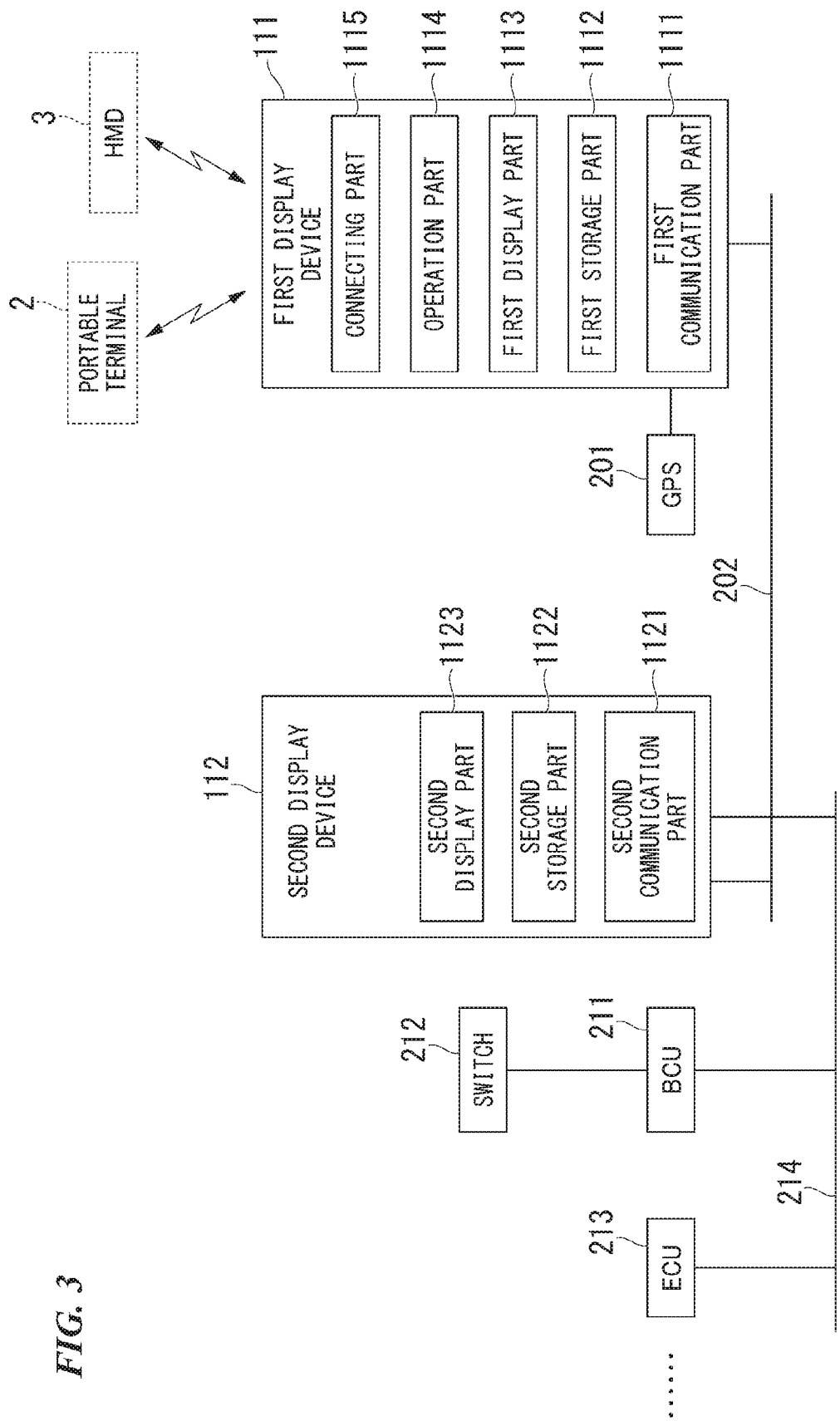
FIG. 3 is a block diagram showing a configuration example of the saddle riding vehicle according to the embodiment.

Next, a configuration example of the saddle riding vehicle 1 of the embodiment will be described. FIG. 3 is a block diagram showing a configuration example of the saddle riding vehicle 1 according to the embodiment. In FIG. 3, only the display device and components related to control of the display device are shown, and an engine, a brake, and the like, are omitted.

As shown in FIG. 3, the saddle riding vehicle 1 includes the first display device 111, the second display device 112, a GPS 201, a BCU 211, a switch 212, and an ECU 213.

The first display device 111 includes a first communication part 1111, a first storage part 1112, a first display part 1113, an operation part 1114, and a connecting part 1115.

The second display device 112 includes a second communication part 1121, a second storage part 1122, and a second display part 1123.

The first display device 111 and the second display device 112 are connected to each other via a first CAN bus 202. The second display device 112, the BCU 211 and the ECU 213 are connected to each other via a second CAN bus 214.

The GPS 201 is connected to the first display device 111.

A portable terminal 2, an HMD 3, and the like, are connected to the first display device 111 through wireless communication or wired communication.

The switch 212 is connected to the BCU 211.

The portable terminal 2 is, for example, a smartphone, a tablet terminal, or the like. The portable terminal 2 performs communication with the first display device 111 through communication of, for example, Bluetooth (Registered trademark) standard. Alternatively, the portable terminal 2 may perform communication with the first display device 111 using a universal serial bus (USB) cable. The portable terminal 2 includes, for example, a display part, an operation part, a communication part, a control part, and a storage part.

The HMD 3 is a head mount display, and mounted on, for example, a helmet. The HMD 3 performs communication with the first display device 111 through communication of, for example, Bluetooth standard. The HMD 3 includes, for example, a display part, an operation part, a communication part, a control part, and a storage part. The HMD 3 displays information output from, for example, the first display device 111.

The GPS 201 is a reception part of a global positioning system (GPS). The GPS 201 acquires, for example, time information and position information and outputs the acquired information to the first display device 111 on the basis of the information received from GPS satellites.

The battery control unit (BCU) 211 controls, for example, a battery and a power supply.

The engine control unit (ECU) 213 controls, for example, fuel adjustment, ignition timing, a speed of the vehicle, the brake, the headlight 15, the front indicator 16, and the like.

The switch 212 is, for example, an ignition key.

The first display device 111 displays information, for example, an engine speed, states of various types of electronic controls, a remaining fuel gauge, a water temperature, a trip distance, an average fuel consumption, an average speed, an instantaneous fuel consumption, a time, an external air temperature, and the like. The first display device 111 acquires a traveling mode or the like according to an operation of the operation part 1114.

The first communication part 1111 allows transmission and reception of information by the second display device 112 via the first CAN bus. The first communication part 1111 receives setting values before the ignition transmitted from the second display device 112 is in an off state (the last setting values) when the ignition is in the off state and a reception termination flag is in a low (L) state.

The first storage part 1112 stores information related to the display device. The information related to the display device is, for example, information such as a display mode (a display related to traveling, a display upon cooperation with the portable terminal 2, and the like), a brightness, and the like. The first storage part 1112 does not store information related to the vehicle after the ignition is in the off state. The information related to the vehicle is, an engine speed, states of various types of electronic controls, a remaining fuel gauge, a water temperature, a trip distance, an average fuel consumption, an average speed, and the like. The first storage part 1112 stores a state of the reception termination flag. The first storage part 1112 stores a default value. In the embodiment, when the information related to the vehicle is not stored after the ignition is in the off state, since a management place of the data is only the second display device 112 and there is no management by the first display device 111, a data management amount can be reduced. In the embodiment, since the information related to the display device is stored, even immediately after the ignition is in the on state, settings related to the display device are instantly applied to the second display device.

The first display part 1113 is, for example, a liquid crystal display device or an organic electro luminescence (EL) display device. The first display part 1113 displays information received from the second display device 112 by the first communication part 1111 during a period in which the reception termination flag is in the L state after the ignition is in the on state. The first display part 1113 displays the information set by the operation part 1114 during a period in which the reception termination flag is in a high (H) state after the ignition is in the on state. The information set by the operation part 1114 also includes the information acquired from the portable terminal 2.

The operation part 1114 is, for example, a touch panel sensor provided on the first display part 1113. The operation part 1114 detects operation results due to operation by a user.

The connecting part 1115 is a connecting part between the portable terminal 2 and the HMD 3. The connecting part 1115 is, for example, a Bluetooth communication part or a USB connecting part.

The second display device 112 displays, for example, information such as a speed, a gear position, a traveling distance, and the like.

The second communication part 1121 acquires the last setting value from the second storage part 1122 when the ignition is in the on state. The second communication part 1121 transmits the acquired last setting value to the first display device 111 via the first CAN bus 202, and the transmission flag is shifted from the L state to the H state.

The second storage part 1122 stores the last setting value. The second storage part 1122 stores information showing a state of the transmission flag. The second storage part 1122 stores information related to the host display device after the ignition is in the off state.

The second display part 1123 is, for example, a liquid crystal display device or an organic EL display device. The second display part 1123 displays the last setting value when the ignition is in the on state and until the information has been received from the first display device 111. The second display part 1123 displays the received information when the information has been received from the first display device 111.

<Display Example of First Display Device 111 and Second Display Device 112>

Figure 4:
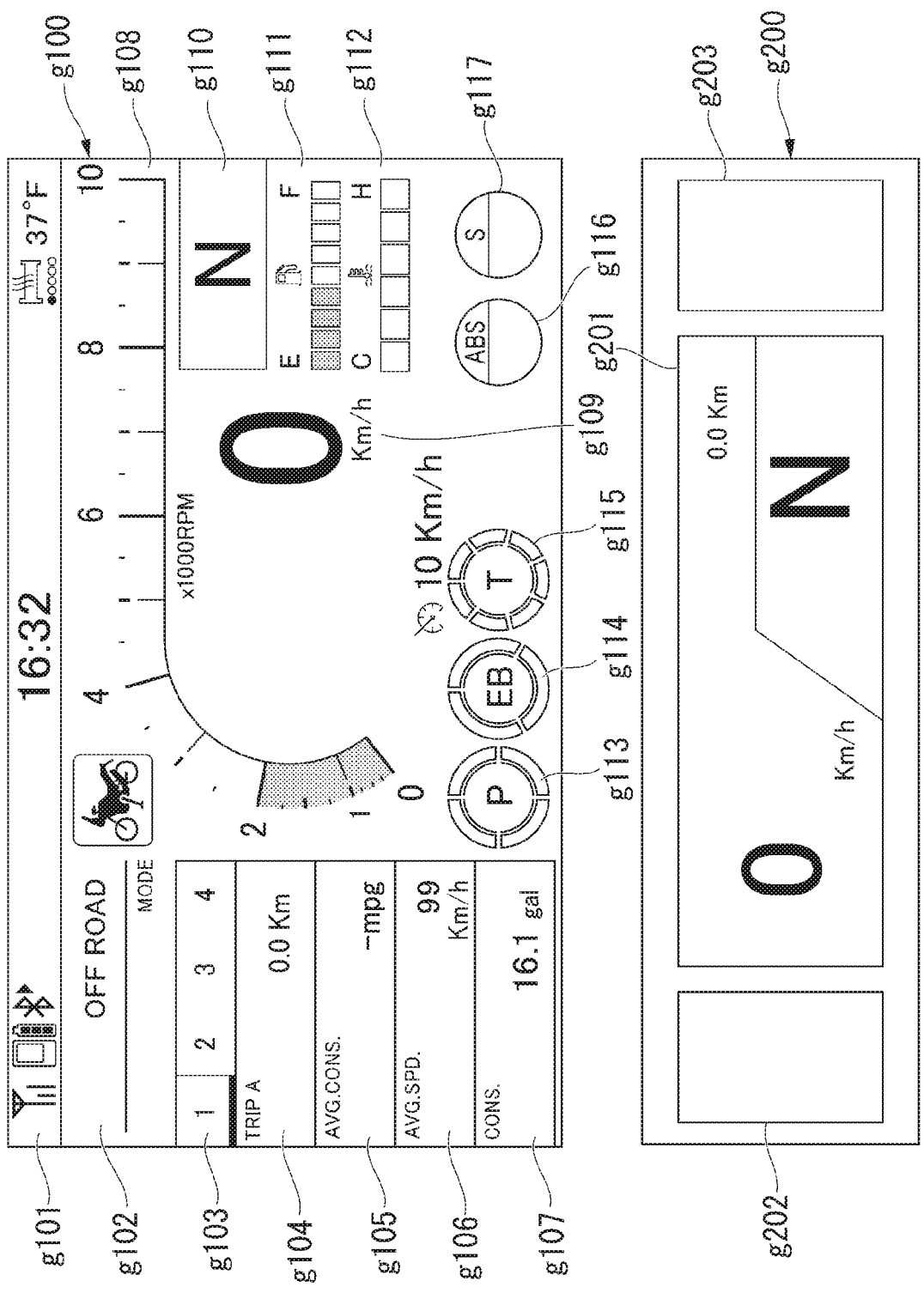
FIG. 4 is a view showing a display example of a first display device and a second display device according to the embodiment.

Next, a display example of the first display device 111 and the second display device 112 will be described. FIG. 4 is a view showing the display example of the first display device 111 and the second display device 112. Reference sign g100 is an example of information displayed on the first display part 1113 of the first display device 111. Reference sign g200 is an example of information displayed on the second display part 1123 of the second display device 112.

The information g100 displayed on the first display part 1113 of the first display device 111 includes information of g101 to g117. The display example of FIG. 4 is an example in which the portable terminal 2 is connected to the first display device 111 through Bluetooth.

In a region of reference sign g101, a state of connection to the portable terminal 2, a residual quantity of the battery of the portable terminal 2, a radio wave state of the portable terminal 2, the current time, and external air temperature information are displayed.

In a region of reference sign g102, a traveling mode is displayed. The traveling mode is, for example, an off road (OFF ROAD), a touring (TOUR) mode, or the like.

In a region of reference sign g103, a tab image of switching the display is displayed.

In a region of reference sign g104, a cumulative traveling distance (TRIP) is displayed.

In a region of reference sign g105, an average fuel consumption [mpg] is displayed.

In a region of reference sign g106, an average speed [km/h] is displayed.

In a region of reference sign g107, an instantaneous fuel consumption amount (CONS.) [gal] is displayed.

In a region of reference sign g108, an engine speed (×1000 [rpm]) is displayed. In a region of reference sign g109, a speed [km/h] is displayed.

In a region of reference sign g110, a state of a gear is displayed.

In a region of reference sign g111, a state of fuel (full or full tank) is displayed.

In a region of reference sign g112, a state of a water temperature (C; cool, H; hot) is displayed.

In a region of reference sign g113, a power level of the engine (levels 1 to 4) is displayed. In a region of reference sign g114, a brake level of the engine (levels 1 to 3) is displayed. In a region of reference sign g115, a level of selectable torque control (HSTC) (levels 1 to 7) is displayed.

In a region of reference sign g116, a state of an antilock brake system (ABS) is displayed.

In a region of reference sign g117, a state of a suspension is displayed.

Information displayed on the first display part 1113 shown in FIG. 4 is an example and not limited thereto. For example, information related to another setting is displayed according to switching of the tab of g103. The information related to the other setting is, for example, various types of equipment setting information set by a user, brightness of a screen, a state of a handle bar switch, and the like.

The information g200 displayed on the second display part 1123 of the second display device 112 includes information of g201 to g203.

In a region of reference sign g201, information shared by the information displayed on the first display part 1113, for example, a speed, a state of a gear, a cumulative traveling distance, and the like, are displayed.

In regions of reference signs g202 and g203, states of various types of settings are displayed by, for example, icons.

The information displayed on the second display part 1123 shown in FIG. 4 is an example and not limited thereto. The information shared by the first display part 1113 may be other information displayed on the first display part 1113.

<Example of Setting Screen>

Next, an example of a setting screen will be described.

Figure 5:
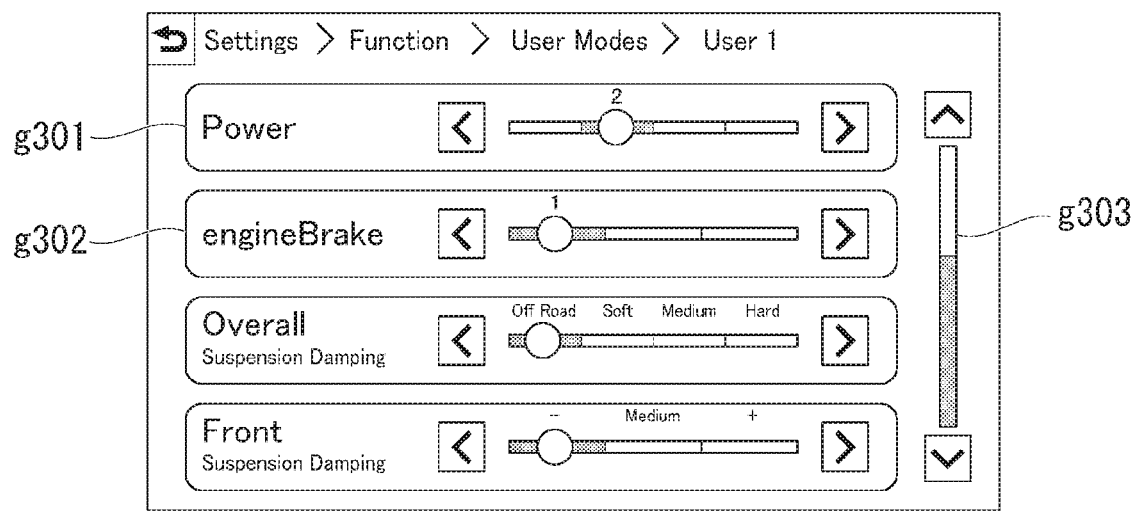
FIG. 5 is a view showing an example of a settings screen using a slider.

FIG. 5 is a view showing an example of a setting screen by a slider. An image of FIG. 5 is displayed when the operation part 1114 is operated and reference sign g113 and reference sign g114 are selected in FIG. 4.

Reference sign g301 is a slider image for setting a power level of the engine.

Reference sign g302 is a slider image for setting a brake level of the engine.

Reference sign g303 is a slider image of selecting a setting item.

Figure 6:
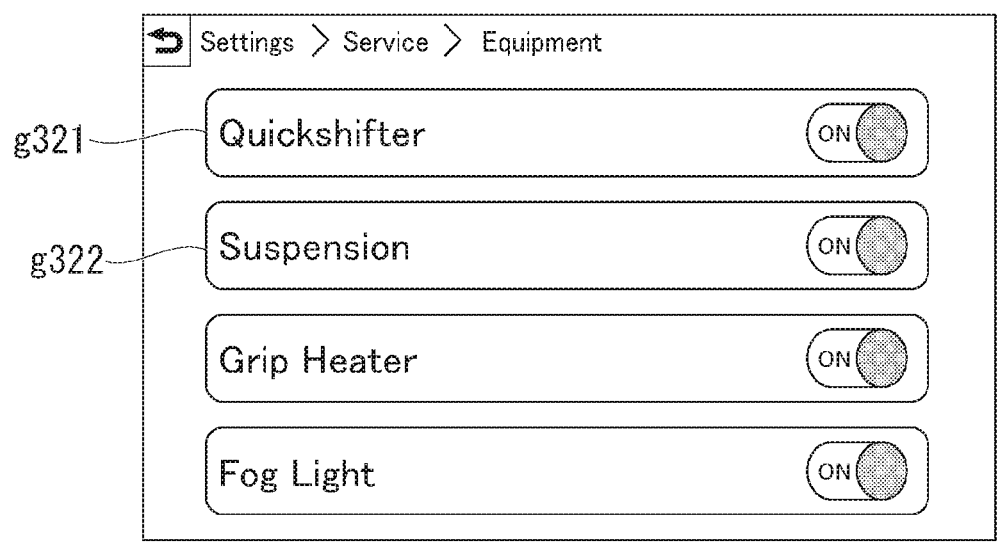
FIG. 6 is a view showing an example of a screen for turning settings on and off.

FIG. 6 is a view showing an example of a setting screen by on and off.

A region of reference sign g321 is an image for setting a quick shifter to an on state or an off state. The quick shifter is processing that electronically performs an action of instantly returning an accelerator.

Reference sign g322 is an image for setting the suspension to an on state or an off state.

<Processing Sequence Example of First Display Device 111 and Second Display Device 112>

Figure 7:
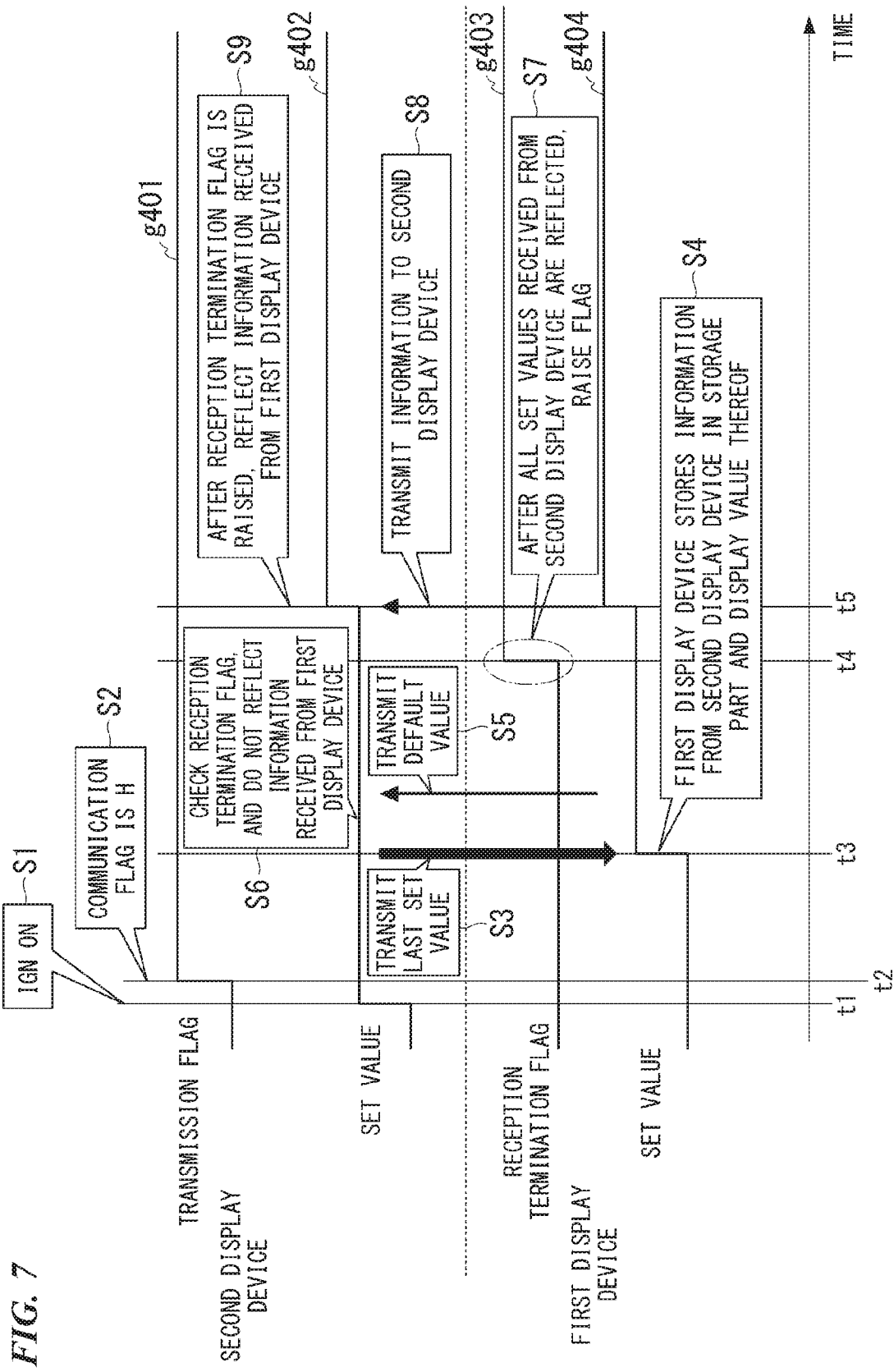
FIG. 7 is a sequence diagram of processing of the first display device and the second display device according to the embodiment.

Next, a processing sequence example of the first display device 111 and the second display device 112 will be described. FIG. 7 is a processing sequence diagram of the first display device 111 and the second display device 112 according to the embodiment. In FIG. 7, reference sign g401 represents a state of a transmission flag, reference sign g402 represents a state of a setting value in the second display device 112, reference sign g403 represents a state of a reception termination flag, and reference sign g404 represents a state of a setting value in the first display device 111. A horizontal axis is a time.

At a time t1, the ignition is in the on state (step S1).

At a time t2, the second communication part 1121 of the second display device 112 shifts the transmission flag from L to H (step S2).

At a time t3, the second communication part 1121 of the second display device 112 acquires the last setting value from the second storage part 1122, and transmits the acquired last setting value to the first display device 111 (step S3).

During a period from the time t3 to the time t4, the first communication part 1111 of the first display device 111 stores the information received from the second display device 112 in the first storage part 1112. Then, the first display part 1113 of the first display device 111 displays the information received from the second display device 112 (step S4).

The first communication part 1111 of the first display device 111 acquires a default value from the first storage part 1112, and repeats transmission of the acquired default value to the second display device 112 (step S5).

During the period from the time t3 to the time t4, the second communication part 1121 of the second display device 112 checks a state of the reception termination flag via the first CAN bus 202. When the reception termination flag is not in the H state, the second communication part 1121 does not reflect the acquired information on the display, or does not acquire the information transmitted from the first display device 111 (step S6).

At the time t4, the first communication part 1111 of the first display device 111 shifts the reception termination flag from L to H when it is detected that the information received from the second display device 112 has been received (step S7).

At the time t5, the first communication part 1111 of the first display device 111 transmits the set information to the second display device 112 as the shared information when the operation part 1114 is operated and the setting is changed (step S8).

At the time t5, the second communication part 1121 of the second display device 112 receives the information transmitted from the first display device 111 and reflects the received information on the display because the reception termination flag is H (step S9).

As described above, in the processing sequence, the second display device 112 does not receive the shared information transmitted from the first display device 111 or does not reflect the shared information transmitted from the first display device 111 on the display on the basis of the reception termination flag. In the processing sequence, the first display device 111 does not store the information related to the vehicle after the ignition is in the off state. Then, the second display device 112 stores the information related to the host display device after the ignition is in the off state.

Accordingly, according to the embodiment, it is possible to prevent the erroneous information from being displayed on the first display device 111 and the second display device 112.

<Another Processing Example>

In the example shown in FIG. 7, while the example in which the first display device 111 transmits the default value to the second display device 112 until reception of the last setting value from the second display device 112 is terminated but the second display device 112 prohibits reception of information from the first display device 111 on the basis of the reception termination flag has been described, there is no limitation thereto.

Figure 8:
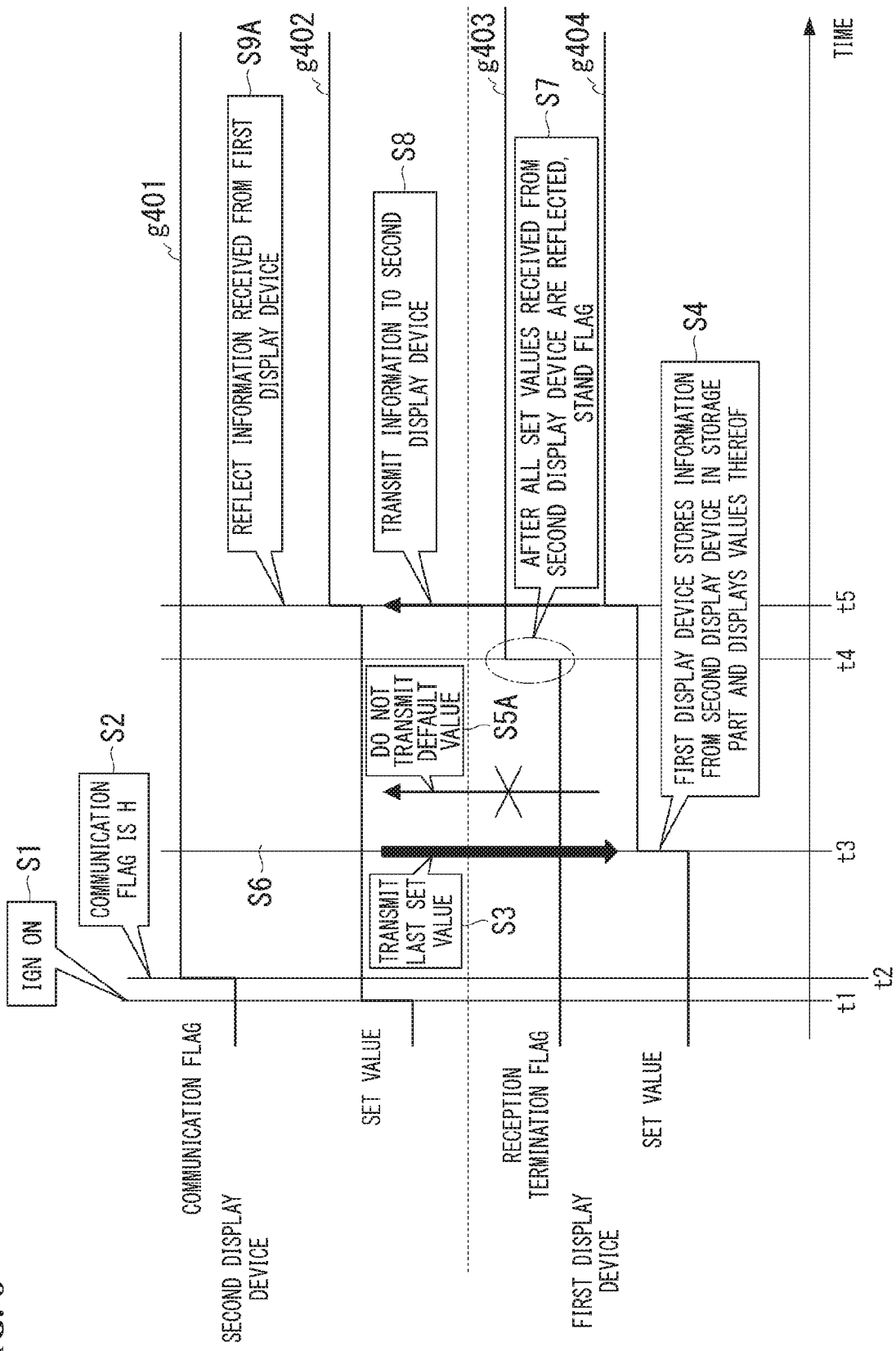
FIG. 8 is a sequence diagram of another method of processing of the first display device and the second display device according to the embodiment.

A method of prohibiting transmission of information to the other second display device 112 will be described with reference to FIG. 8. FIG. 8 is a sequence diagram of another method of processing of the first display device 111 and the second display device 112 according to the embodiment. In processing which is the same as in FIG. 7, the same reference signs will be used and duplicated description will be omitted.

During a period in which the reception termination flag is L, the first communication part 1111 of the first display device 111 does not perform transmission (prohibits transmission) of the default value to the second display device 112 (step SSA).

At the time t5, the second communication part 1121 of the second display device 112 receives the shared information transmitted from the first display device 111 and reflects the received shared information on the display (step S9A).

As described above, in the processing sequence, the first display device 111 does not transmit the information of the default value to the second display device 112 (prohibits transmission of the information) on the basis of the reception termination flag. Accordingly, according to the embodiment, it is possible to prevent the erroneous information from being displayed on the first display device 111 and the second display device 112.

<Description of Comparative Example without Using Flag>

Figure 9:
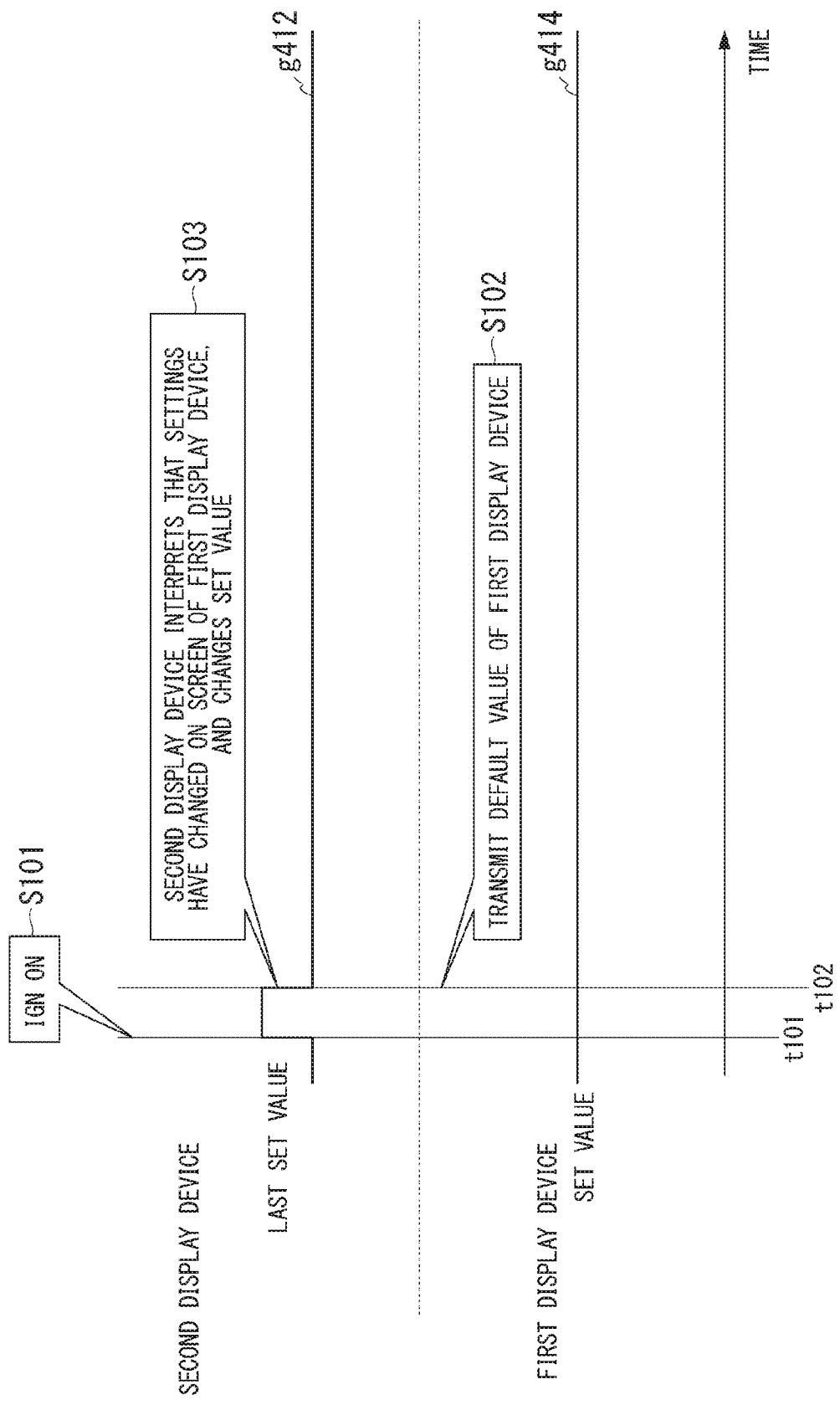
FIG. 9 is a sequence diagram of processing of a first display device and a second display device according to a comparative example.

Here, a comparative example without using a transmission flag and a reception termination flag of the embodiment will be described. FIG. 9 is a sequence diagram of processing of a first display device and a second display device according to a comparative example. In FIG. 9, reference sign g412 represents a state of a setting value in the second display device, and reference sign g414 represents a state of a setting value in the first display device. A horizontal axis is a time.

At a time t101, the ignition is in the on state (step S101).

At a time t102, the first display device transmits the default value of the first display device to the second display device (step S102).

At the time t102, the second display device interprets that the default value transmitted from the first display device as the operation part of the first display device operating and the settings having been changed, and reflects this in on the display (step S103). For example, the information of the last setting value before the ignition is in the off state is displayed on the second display device during a period from the time t101 to the time t102.

In this way, in the comparative example without using the reception termination flag, after the ignition is in the on state, the default value from the first display device may be transmitted to the second display device, or the second display device may receive the default value and reflect the default value on the display. As a result, in the comparative example, the erroneous information may be applied to the one display device according to the state of the vehicle, or the erroneous information may be reflected to another display part.

On the other hand, in the embodiment, after the ignition is in the on state, the second display device 112 does not reflect the default value transmitted from the first display device 111 on the display even when the default value has been received on the basis of the reception termination flag set by the first display device 111.

Alternatively, in the embodiment, the first display device 111 is configured to prohibit transmission of new information to the second display device 112 until reception of the last setting value from the second display device 112 using the reception termination flag is terminated.

Accordingly, according to the embodiment, after the ignition is in the on state, it is possible to prevent the default value, which is not the setting value before the ignition is in the on state, from being transmitted from the first display device 111 to the second display device 112.

In the embodiment, since predetermined information transmitted from the second display device 112 is transmitted from the first display device 111 to the second display device 112 after the predetermined information is reflected by the first display device 111, transmission of correct information becomes possible.

<Cooperative Example of First Display Device 111 and Portable Terminal 2>

Figure 10:
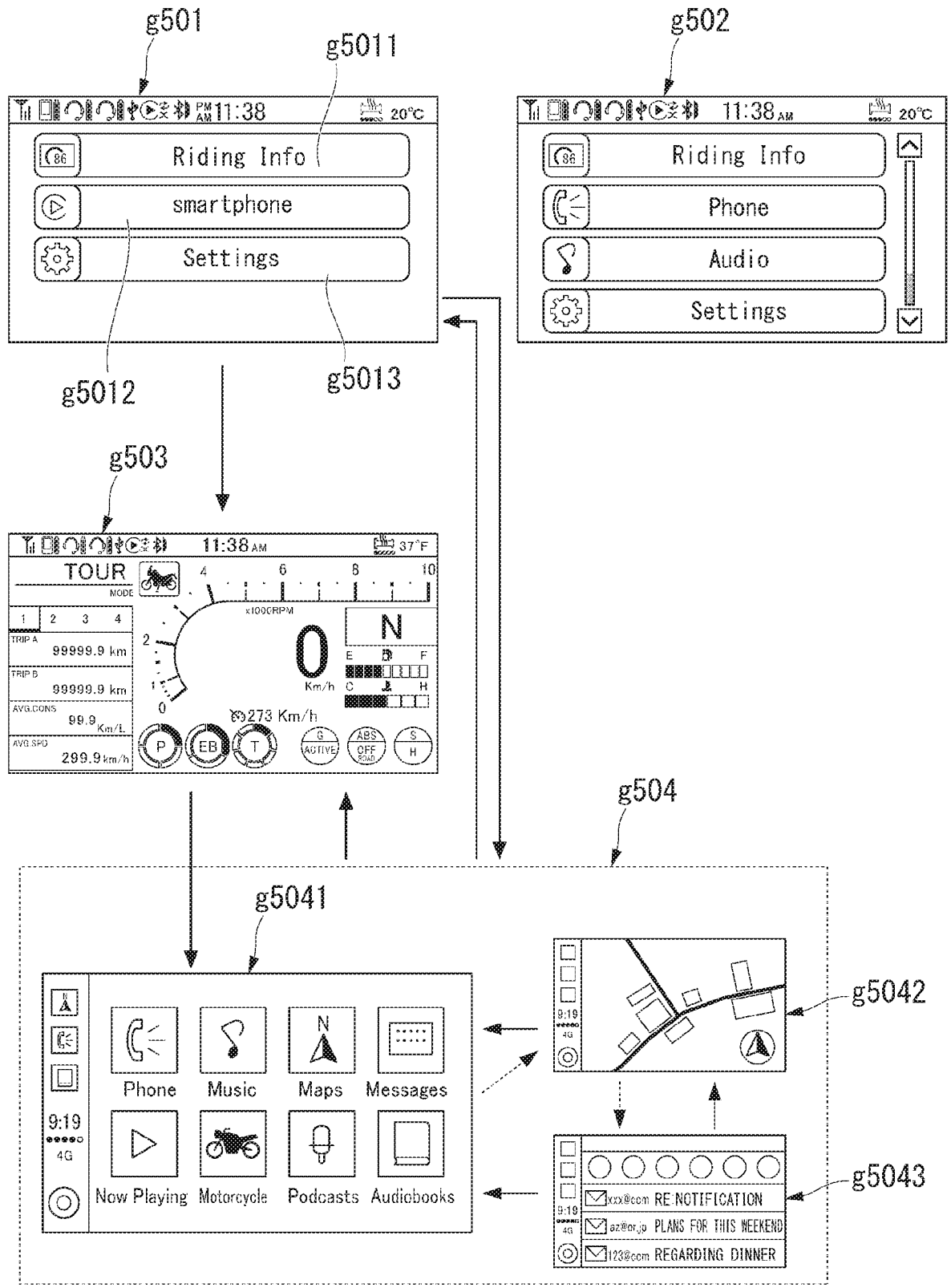
FIG. 10 is a view showing an example of cooperation between a first display device and a portable terminal according to the embodiment.

Next, a cooperative example of the first display device 111 and the portable terminal 2 will be described. FIG. 10 is a view showing a cooperative example of the first display device 111 and the portable terminal 2 according to the embodiment.

Reference sign g501 is an example of a screen on which cooperation with the portable terminal 2 is selected. In the screen of reference sign 501, when a region of reference sign g5011 is selected, the region is shifted to the screen on which the traveling information is displayed. When a region of reference sign g5012 is selected, the region is shifted to the screen on which cooperation with the portable terminal 2 is performed. When a region of reference sign g5013 is selected, the region is shifted to the setting screen.

Reference sign g502 is an example of the screen on which setting of wireless communication is performed.

Reference sign g503 is an example of the screen on which information related to the vehicle and information related to traveling are displayed.

Reference sign g504 is an example of the screen on which the first display part 1113 is displayed after the first display device 111 cooperates with the portable terminal 2.

Reference sign g5041 is an example of the screen on which information displayed on the screen of the portable terminal 2 is shared and displayed. The screen contains images or the like of icon buttons corresponding to applications. The applications are, for example, a telephone, music, a map, mail, and the like.

Reference sign g5042 is an example of an image displayed when a map application is selected in reference sign g5041.

Reference sign g5043 is an example of an image displayed when a mail application is selected in reference sign g5041.

A screen displayed upon connection to the portable terminal 2 shown in FIG. 10 is an example, and there is no limitation thereto. The screen may be an image according to the screen of the portable terminal 2 connected to the first display device 111.

In the above-mentioned example, while the example in which each of the first display device 111 and the second display device 112 determines and processes a reception state or a state of the flag has been described, there is no limitation thereto. The ECU 213 or the like connected to the CAN bus may perform determination, and instruct and control the first display device 111 and the second display device 112.

For example, in the case of the processing in FIG. 7, the ECU 213 may perform generation and change of the flag and the information that shows the state of the flag may be transmitted to the second display device 112. Then, the second display device 112 may determine whether the information received from the first display device 111 is reflected in the display on the basis of the information that shows the state of the flag acquired from the ECU 213.

In the case of the processing in FIG. 8, the ECU 213 may perform generation and change of the flag and the information that shows the state of the flag may be transmitted to the first display device 111. Then, the first display device 111 may determine whether the information is transmitted to the second display device 112 on the basis of the information that shows the state of the flag acquired from the ECU 213.

In the above-mentioned example, while the example in which the two display devices are provided has been described, there may be three or more display devices. For example, when there are three display devices, one of the first display device to the third display device may generate and change the flag and the other display devices may reflect the flag on the basis of this flag. Alternatively, when there are three display devices, the first display device of the first display device to the third display device may perform generation and change of the flag and transmission of the information to the other display device is prohibited on the basis of the state of the flag.

The entire processing or a part of the processing performed by the first display device 111, the second display device 112 and the ECU 213 may be performed by recording a program configured to realize all or some of functions of the first display device 111, the second display device 112 and the ECU 213 according to the present invention on a computer-readable recording medium, and reading and executing the program recorded on the recording medium using a computer system. The "computer system" disclosed herein includes an OS or hardware such as peripheral equipment or the like. The "computer system" includes a WWW system including a homepage-providing environment (or a display environment). The "computer-readable recording medium" is referred to as a portable storage medium such as a flexible disk, a magneto-optical disk, a ROM, a CD-ROM, or the like, or a storage device such as a hard disk or the like installed in the computer system. Further, the "computer-readable recording medium" also includes those holding programs for a certain period of time, for example, a volatile memory (RAM) in the computer system that is a server or a client when the programs are transmitted via a network such as the Internet or the like, or a communication line such as a telephone line or the like.

The program may be transmitted to another computer system via a transmission medium or by transmission waves in a transmission medium from the computer system in which the program is stored on the storage device or the like. Here, the "transmission medium" that transmits the program is referred to as a medium having a function of transmitting information, for example, a network (a communication network) such as the Internet or the like, or a communication channel (a communication line) such as a telephone line or the like. The program may be configured to realize a part of the above-mentioned function. Further, it may be a so-called differential file (differential program) that can realize the above-mentioned function in combination with a program already recorded in the computer system.

Hereinabove, while the aspect configured to perform the present invention has been described using the embodiment, the present invention is not particularly limited to the above-mentioned embodiment, and various modifications and substitutions may be added without departing from the spirit of the present invention.

What is claimed is:

1. A saddle riding vehicle comprising:
a first display device;
a second display device; and
a first transmission unit configured to transmit predetermined information from the second display device to the first display device and a second transmission unit configured to transmit shared information that is commonly displayed by the second display device from the first display device to the second display device,
wherein the second display device prohibits the shared information transmitted from the first display device from being reflected in a display when reception of the predetermined information by the first display device has not been terminated.

2. A saddle riding vehicle comprising:
a first display device;
a second display device; and
a first transmission unit configured to transmit predetermined information from the second display device to the first display device and a second transmission unit configured to transmit shared information that is commonly displayed by the second display device from the first display device to the second display device,
wherein the first display device prohibits transmission of the shared information to the second display device when reception of the predetermined information by the first display device has not been terminated.

3. The saddle riding vehicle according to claim 1, wherein, when information stored in the first display device is changed to the predetermined information, the first display device determines that the predetermined information has been received.

4. The saddle riding vehicle according to claim 1, wherein, after an ignition is brought into an off state, the first display device does not store information related to the vehicle.

5. The saddle riding vehicle according to claim 1, wherein, after the ignition is brought into an off state, the second display device stores information related to a host display device.

6. A method of controlling a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, the method comprising:
prohibiting the second display device from reflecting the shared information transmitted from the first display device in a display when reception of the predetermined information by the first display device has not been terminated.

7. A method of controlling a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, the method comprising:
prohibiting the first display device from transmitting the shared information to the second display device when reception of the predetermined information by the first display device has not been terminated.

8. A computer-readable non-transitory storage medium that stores a program causing a computer included in a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, to execute to:
prohibit the second display device from reflecting the shared information transmitted from the first display device in a display when reception of the predetermined information by the first display device has not been terminated.

9. A computer-readable non-transitory storage medium that stores a program causing a computer included in a saddle riding vehicle including: a first display device; a second display device; and a first transmission unit configured to transmit predetermined information from the second display device to the first display device and a second transmission unit configured to transmit shared information that is commonly displayed by the second display device from the first display device to the second display device, to execute to:

prohibit the first display device from transmitting the shared information to the second display device when reception of the predetermined information by the first display device has not been terminated.

10. The saddle riding vehicle according to claim 2, wherein, when information stored in the first display device is changed to the predetermined information, the first display device determines that the predetermined information has been received.

11. The saddle riding vehicle according to claim 2, wherein, after an ignition is brought into an off state, the first display device does not store information related to the vehicle.

12. The saddle riding vehicle according to claim 2, wherein, after the ignition is brought into an off state, the second display device stores information related to a host display device.

* * * * *